United States Patent [19]
Wood et al.

[11] Patent Number: 4,793,126
[45] Date of Patent: Dec. 27, 1988

[54] COMPACTOR AND DUMP CONTROLLING DEVICE FOR A COTTON HARVESTER

[75] Inventors: William R. Wood, Ames; Ronald L. Reichen, Alleman; Joe H. Hoeksema; Schlueter, Francis E., both of Des Moines, all of Iowa

[73] Assignee: Deere & Company, Moline, Ill.

[21] Appl. No.: 612,764

[22] Filed: May 22, 1984

[51] Int. Cl.$^4$ .................... A01D 46/08; A01D 45/00; A01D 90/00
[52] U.S. Cl. ........................ 56/16.6; 56/28; 298/8 H; 414/328
[58] Field of Search ............... 56/16.6, 30, 28; 298/8 H, 10; 414/318, 329, 397; 221/90; 222/502, 503

[56] References Cited
U.S. PATENT DOCUMENTS
4,458,588  7/1984  Steele .................................. 298/8 H

FOREIGN PATENT DOCUMENTS
612657  6/1978  U.S.S.R. .............................. 298/10

*Primary Examiner*—Paul J. Hirsch

[57] ABSTRACT

In a cotton harvester, a pair of fork assemblies are mounted between the ends of the basket for independently rocking about a fore-and-aft extending pivotal axis. A separate hydraulic cylinder operates each fork assembly to compact the cotton against the side of the basket and to selectively hold a substantial portion of the cotton in the basket during dumping. The cylinders are plumbed in parallel so that uneven loads can be compressed with substantially uniform pressure from the front to rear of the basket.

15 Claims, 3 Drawing Sheets

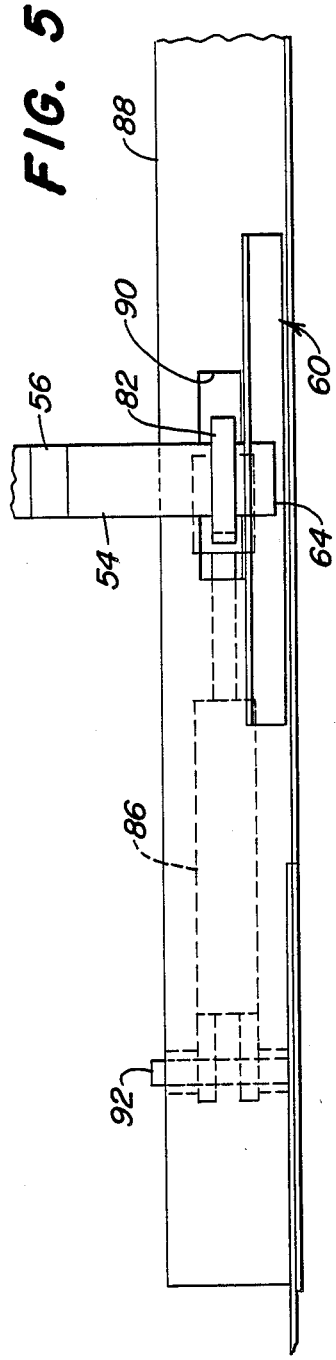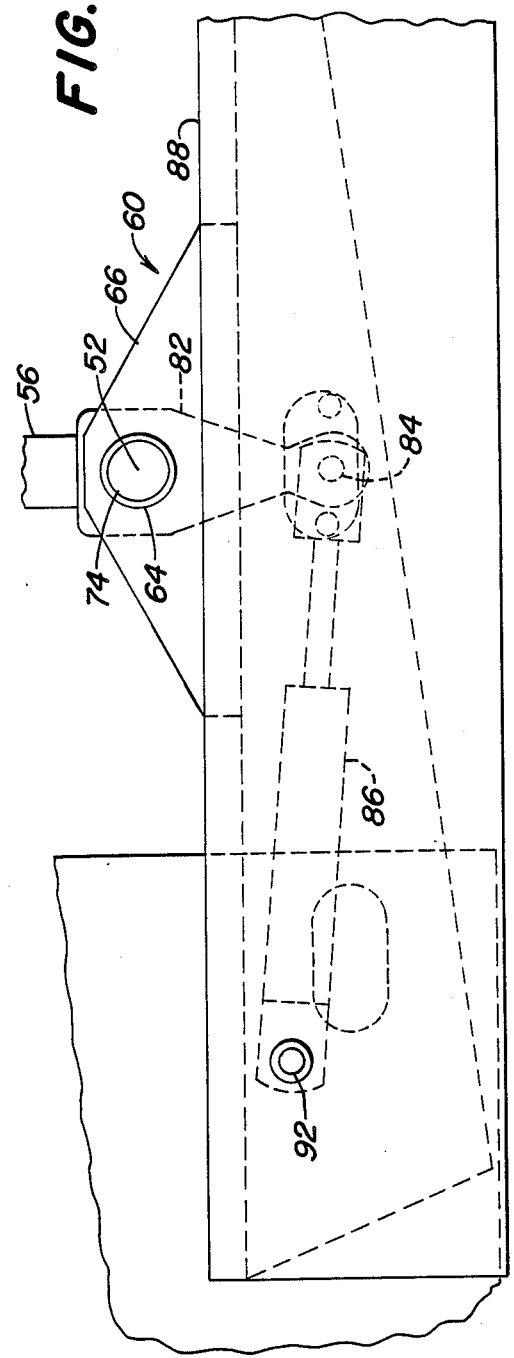

COMPACTOR AND DUMP CONTROLLING DEVICE FOR A COTTON HARVESTER

BACKGROUND OF THE INVENTION

The present invention relates generally to cotton harvesters, and more specifically to a device for compacting and controlling the dumping of cotton i the basket of such harvesters.

A typical cotton harvester includes an overhead receptacle or basket supported on a mobile frame. An air system is used to blow harvested cotton from harvesting unit mounted at the forward end of the frame upwardly and rearwardly to the forward top portion of the basket. Under most conditions, the rear of the basket generally fills the quickest, with the forward end of the basket filling the last. The cotton is highly compressible and therefore to provide maximum basket capacity, a compacting device is typically used to compress the cotton. Previous compacting devices have included bars pivotally connected near the upper forward end of the basket and pivotable about a transverse axis to compress the cotton as it rises in the basket. Such devices are shown, for example, in U.S. Pat. Nos. 3,422,751 and 3,412,532. In another type of structure, shown in U.S. Pat. No. 3,215,291, a vane assembly is pivotally connected near the bottom of the basket for rocking about a transversely extending axis. The vane is normally in a position away from the cotton inlet and when cotton begins to block the rear grates, the vane is rocked toward the inlet and returned to the original position.

The previously available basket arrangements with the pivoting tines suffered from several shortcomings. When there is a variation in the amount of cotton compacted along the length of the vane, the rocking of the tines is limited by the area of the largest loading while the areas which are not so heavily loaded will not be compacted to the same degree. The transverse orientation of the tines can often interfere with the proper distribution of the cotton in the basket as the cotton is delivered from the air ducts. The basket will not fill properly unless the operator carefully controls the device while the cotton basket fills.

Another problem arises with present basket systems when the basket is dumped into a trailer or module builder. At times a full basket is not needed to complete the load in the trailer or module builder, and cotton often spills since it is very difficult to dump only the needed amount of cotton. At other times a partial dump is needed on each end of the trailer or module builder. Since the dump cannot be accurately controlled, distributing the cotton after the dumping process is required and this is difficult and time-consuming.

It is therefore an object of the present invention to provide an improved compacting and dump controlling device for a cotton harvester basket.

It is a further object of the invention to provide a compacting device for a cotton harvester which does not interfere with the cotton as it is delivered from the air ducts. It is a further object to provide such a device which requires a minimum amount of operator attention during the basket loading process.

It is a further object of the present invention to provide a compacting device which does not stall as a result of the basket filling at a differential rate along the length of the compacting device.

It is still another object of the invention to provide a compacting and dump controlling device for a cotton harvester which provides a better distribution of cotton when dumped and a less chance of cotton falling on the ground during the dumping process. It is still another object to provide such a device which permits a partial basket load to be dumped into a trailer or module builder.

It is a further object of the present invention to provide a cotton harvester basket with at least two compactor fork assemblies which may be rocked back and forth with respect to the sidewalls generally in unison but which can rock independently of each other when the cotton load is unevenly distributed relative to the compactor assemblies.

In accordance with the above objects a pair of independently rockable compactor fork assemblies is pivotally connected for rocking about axially aligned and fore-and-aft extending pivots located between the front and rear ends of the cotton receptacle. Each compactor fork assembly is connected to a separate hydraulic cylinder and the two cylinders are plumbed in parallel so that the compactor forks act in the same direction when activated but can pivot independently with respect to each other so that uneven loads can be compressed with substantially uniform pressure from front to rear. During dumping when the basket is pivoted toward one side of the implement, the compactor forks may be pivoted to compress a partial load of the cotton towards one side of the wall and prevent it from falling into the trailer or module builder. After a portion of the load is dumped, the implement may be repositioned and the compactor vanes released to permit the remainder of the cotton to fall into the trailer or module builder.

These and other objects, features and advantages of the present invention will become apparent to those skilled in the art from the description which follows and from the drawings.

BRIEF DESCRIPTION OF THE DRAWINGS

FIG. 5 is an enlarged view of the lower rear portion of the basket.

FIG. 6 is a view taken along lines 6—6 of FIG. 5.

DESCRIPTION OF THE PREFERRED EMBODIMENT

Figure 1:
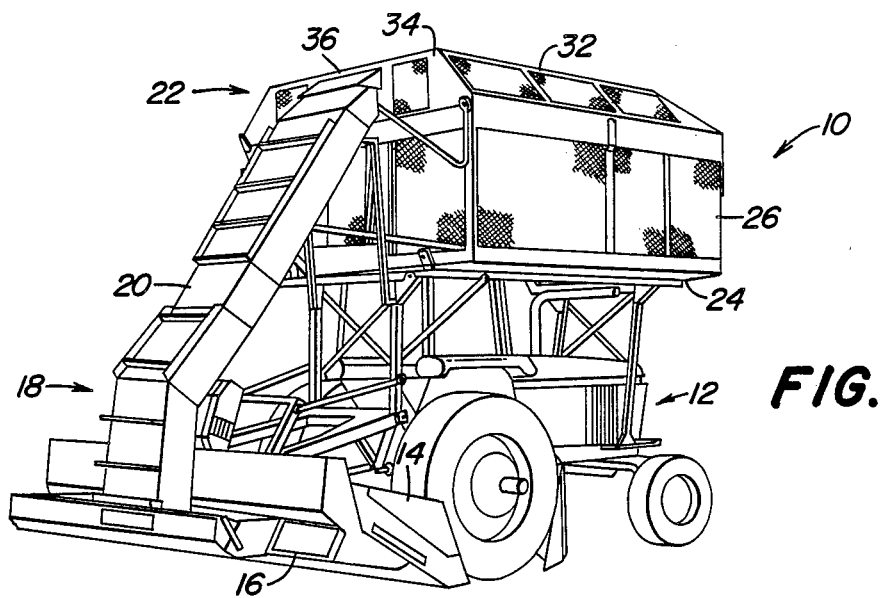
FIG. 1 is a perspective view of a tractor-mounted cotton harvester receptacle including the device of the present invention.

Referring now to FIG. 1, therein is shown a cotton harvester 10 mounted on a tractor 12 for forward movement over a field having parallel rows of cotton plants. A plurality of cotton harvesting units 14 are transversely spaced on a rear-mounted frame 16 supported from the aft end of the tractor 12. Cotton removed by the units 14 is transferred to a centrally located air conveying system indicated generally at 18 which includes a cotton conveying duct 20 extending upwardly to a cotton receptacle or basket 22 supported above the tractor 12. The basket 22 is generally of conventional construction and includes floor 24, a sidewall 26 extending upwardly from one side of the floor 24, an opposite sidewall 28 extending upwardly and inclined outwardly from the floor 24. The lower portion of the basket 22 is enclosed at the rearward end by a rear end wall 30 and at the forward end by a similarly shaped front end wall (not shown).

The basket 22 includes a generally dome-shaped top enclosure 32 which is pivotally connected for rocking about a fore-and-aft axis to the sidewall 26. The dome-shaped top enclosure includes a rear end wall 34 having a hooded opening 36 which aligns with the upper end of the cotton conveying duct 20 when the basket is in the field-working position shown in FIG. 1. Harvested cotton is blown upwardly through the duct 20 and into the basket 22 through the opening 36.

The dump side of the basket 22, that is, the side of the basket corresponding to the inclined sidewall 28, is pivotally connected by bracket structure 38 (FIGS. 2 and 3) to support frame arms 40 which extend upwardly and outwardly from one side of the harvester frame. The basket 22 is rockable upwardly about a fore-and-aft extending axis indicated generally at 42, by basket dump cylinders 44 connected between the harvester frame and the sidewall 28 of the basket. As the cylinders 44 are extended to rock the basket 22 upwardly about the pivotal axis 42, linkage (not shown) pivots the dome-shaped top enclosure 32 with respect to the remainder of the basket 32 to provide an unencumbered space outwardly and downwardly from the basket so that cotton may be dumped into a trailer or module builder such as indicated generally at 46.

Figure 4:
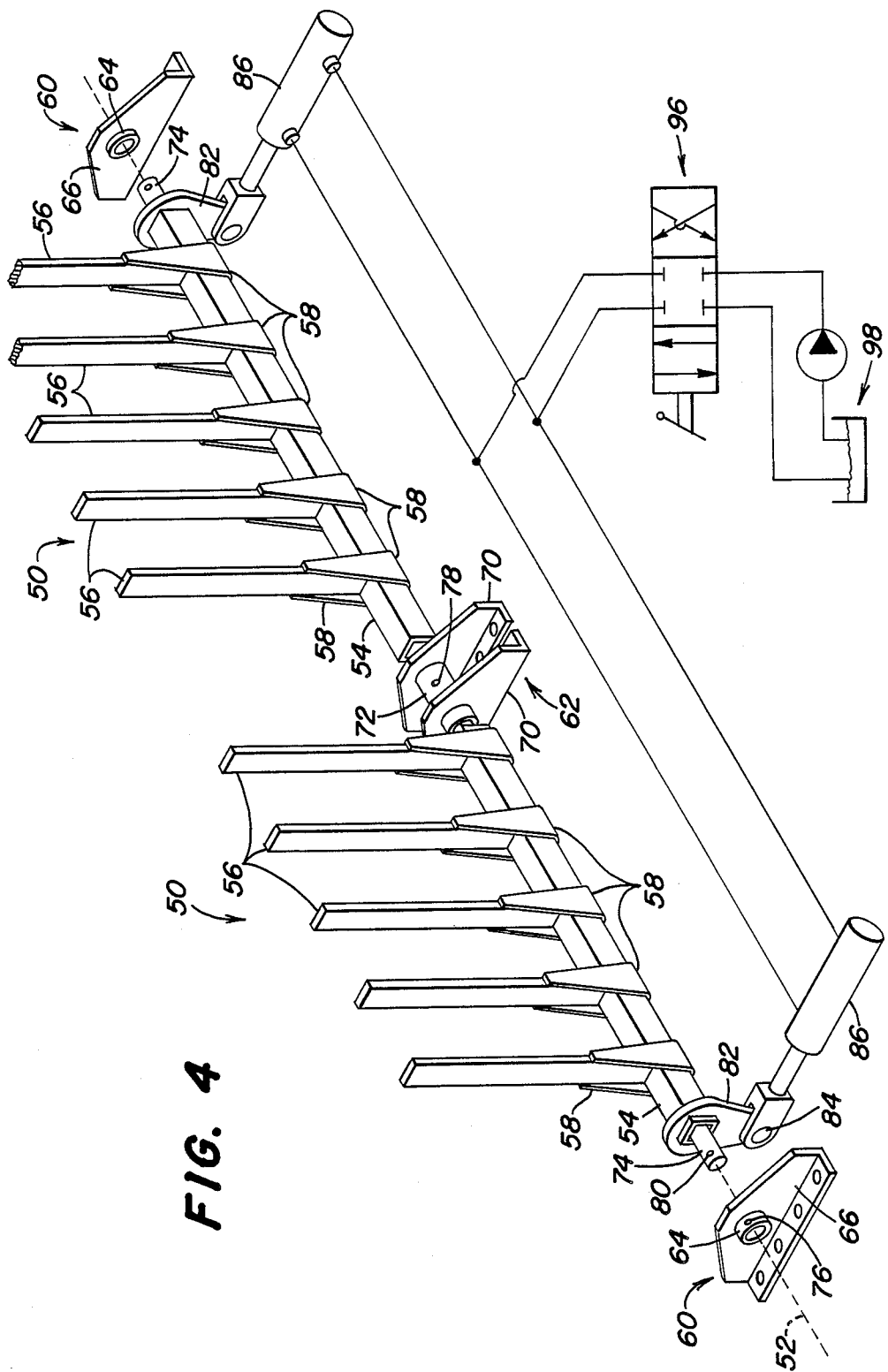
FIG. 4 is an enlarged, exploded view of the compactor assembly.

A pair of compactor fork assemblies 50 is connected for rocking within the basket 22 about a fore-and-aft extending pivotal axis indicated generally at 52. As best seen in FIG. 4, each compactor fork assembly 50 includes tube 54, which in the preferred embodiment is square although other shapes could also be utilized, supporting a plurality of upright forks 56 which are connected to and extend perpendicularly from the top face of the tube 54 at generally equally spaced intervals along the length of the tube. The forks 56 are fabricated from tubular members having a rectangular cross section with the narrow side of the members facing the direction of rotation. For increased strength, a trapezoidal brace 58 may be welded to each side of the square tube 54. The brace 58 includes a narrow upper end welded to the narrow face of the fork 56 and a lower end which angles around the lower face of the square tube 58. Each brace 58 is welded to the bottom and side of the square tube 58 and to the edges of the corresponding upright fork 56. The two compactor fork assemblies 50 are generally identical in construction and are supported end-to-end adjacent the floor 24 of the basket 22.

The fork assemblies 50 are supported for rocking about the fore-and-aft extending axis 52 by a pair of end fork bearing brackets 60 connected near the front and rear end walls of the basket 22 and by a center bearing assembly 62 centrally located with respect to the basket floor 22. Each end fork bearing bracket includes a fork pivot bushing 64 connected to an upright leg 66 of the bracket. The center bearing assembly 62 includes a pair of brackets 70 connected to the basket floor 24 and supporting a center spacer 72 which extends through the sides of the brackets and is axially aligned with the fork pivot bushing 64 of the end brackets 60.

In the preferred embodiment, as best seen in FIG. 4, a pivot tube 74 having an outer diameter approximately equal to the inside dimension of the square tube 54 is inserted through the respective tubes 54 of the individual fork assemblies 50 and through the spacer 72. The ends of the pivot tube 74 are supported in the fork pivot bushings 64. The pivot tube 74 is non-rotatably fixed in the pivot bushing 64 and the spacer 72 by inserting pins (not shown) through holes 76 and 78 and through corresponding holes 80 in the tube 74. Each square tube 54 fits sufficiently loose over the pivot tube 74 so that the compactor fork assembly may be pivoted about the axis of the tube. Alternatively, the pivot tube 74 may be eliminated by utilizing a round tube 54 and permitting the tube to rotate in the bushings 64 and center spacer 72.

An arm 82 is fixed to the end of each square tube 54 adjacent the corresponding bracket 60. Each arm 82 extends downwardly to a lower end having a pivotal connection 84 with the rod end of a cylinder 86. As the cylinder 86 is extended and retracted, the compactor fork assembly 50 will rock about the axis of the pivot tube 74. In the preferred embodiment, the bracket 60 is supported on or adjacent a horizontal ledge 88 (see FIGS. 5 and 6) which extends inwardly from the end of the basket 22 a short distance. The ledge 88 is slotted at 90 to permit the arm 82 to extend downwardly below the level of the ledge. The rod end of the cylinder 86 is supported closely adjacent the lower side of the ledge 88 and the end of the basket by a pivot 92 when the upright forks 56 of the assembly 50 are in the vertical position as shown in FIG. 6, the pivotal connection 84 with the rod end of the cylinder 86 is located directly below the pivot tube 74 slightly below the level of the pivot 92. Sufficient space is provided so that the compactor fork assembly 50 can be rocked back and forth a substantial distance from the vertical position. In the preferred embodiment, the forks 56 may be rocked approximately thirty degrees in either direction from the vertical position as shown in FIGS. 4 and 6. The compactor fork assemblies 50, which are generally identical in construction, ar axially aligned and extend in the fore-and-aft direction substantially the entire length of the basket 22. Each assembly 50 may be rocked independently of the remaining assembly 50.

In the preferred embodiment, the cylinders 86 (FIG. 4) are plumbed in parallel and are connected through an operator control valve 96 to a source of hydraulic fluid 98 on the tractor. By moving the operator control valve to the left as shown in FIG. 4, fluid under pressure is supplied to the cylinder ends to extend the cylinders 86 and rock the forks 56 in a clockwise direction toward one side of the basket 22. Moving the operator control valve to the right pressurizes the rod end of the cylinder 86 to retract the cylinder and rock the forks 56 in the counterclockwise direction toward the opposite side of the basket 22. The compactor fork assemblies will move generally in unison until the force necessary to rock the individual assemblies begins to vary, for example, when one end of the basket is filling more rapidly than the opposite end. With the cylinders 86 plumbed in parallel, the fork assemblies 50 can be rocked to provide substantially equal compaction regardless of differential basket filling. The fore-and-aft orientation of the compactor fork assemblies 50 prevent the forks 56 from interferring with the distribution of the cotton in the basket as it is delivered from the air duct 20. The cotton is blown into the basket in a direction generally parallel to the axis of rotation of the compactor fork assemblies 50 at a location directly above the assemblies. As the basket 22 fills, the operator from time to time can move the control valve 96 to pivot the assemblies 50 from one side of the basket to the other to compact the cotton between the narrow sides of the upright forks 56 and the corresponding side of the basket 22. Since the compactor fork assemblies 50 act independently of each other, variations in front to rear load density will automatically be compensated for to provide optimum loading and increased productivity.

The bearing arrangement of the square tube 54 supported on the pivot tube 74 provides a rugged and generally maintenance-free arrangement which can withstand relatively large amounts of dirt and debris. The serviceability of the structure is enhanced by supporting the cylinders 86 below the ledge 88 out of contact with the cotton. Even when the cotton basket is full, repairs can be made in the cylinder area without difficulty. In addition, if a fluid leak should develop in the hydraulic cylinder system, the cotton in the basket 22 is protected from contamination.

Figure 2:
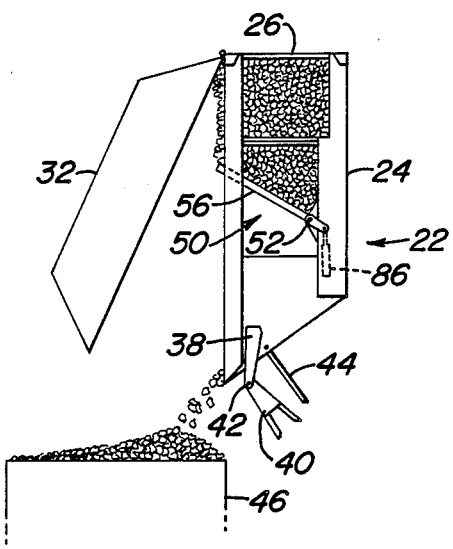
FIG. 2 is a rear view of a portion of the harvester shown in FIG. 1 with the basket in a dumping position showing the compactor fork assemblies holding a portion of the cotton in the receptacle.
Figure 3:
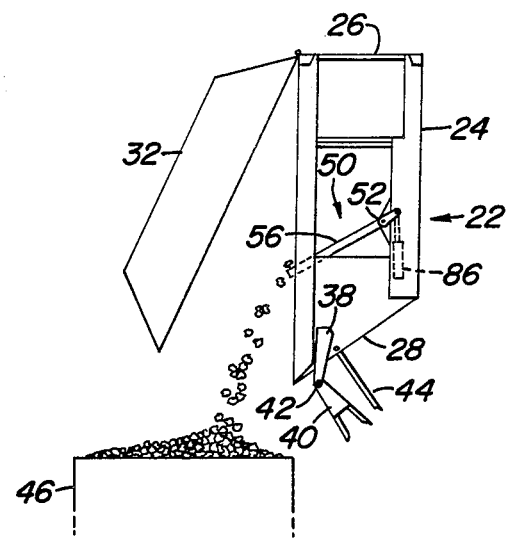
FIG. 3 is a view similar to FIG. 2 but showing the fork assemblies pivoted downwardly to permit the remaining portion of the cotton load to exit the basket into the trailer or module builder.

At times when a full basket of cotton is not needed to complete the load in the trailer or module builder 46 (FIGS. 2 and 3), or when a partial dump is needed on each end of the trailer or module builder, the operator simply moves the control valve 96 to pivot the forks 56 toward one side of the basket prior to dumping. The cotton is then trapped between the forks 56 and the basket side to prevent the cotton from falling out until the forks are rocked toward the opposite side. Preferably, as shown in FIG. 2, the forks 56 are pivoted towards the sidewall 26 opposite the pivotal axis 42 to initially hold the top portion of the load while permitting the lower portion to exit in the conventional manner into the trailer or module builder 46. Once the lower portion of the basket is emptied, the harvester may be repositioned as necessary. Thereafter, the operator moves the control 96 to rock the forks in the opposite direction (FIG. 3) to release the cotton in the upper portion of the basket. Holding a partial load longitudinally in the basket provides better distribution of the cotton when dumped and less chance of the cotton falling on the ground.

Having described the preferred embodiment, it will be apparent that modifications can be made without departing from the scope of the invention as defined in the accompanying claims.

We claim:

1. In a cotton harvester including a basket having fore-and-aft extending sidewalls and a lower horizontal surface, means for directing a stream of cotton in the fore-and-aft direction into the basket between the sidewalls, means for rocking the basket about a first axis to dump the cotton, fork structure including upright fore-and-aft spaced forks supported for rocking in the basket below the stream of incoming cotton about a pivotal axis generally parallel to the first axis, wherein the axes extend substantially in the fore-and-aft direction, means for rocking the fork structure about the pivotal axis to compress cotton against the sidewalls as the cotton enters the basket and to hold a partial load of cotton against one of the sidewalls of the basket as the basket is rocked about the first axis, wherein the fork structure comprises two fork assemblies supported end-to-end in the basket for independent rocking about the pivotal axis, and means for providing a substantially constant force of the forks against the cotton regardless of differential basket loading in the axial direction.

2. The invention as set forth in claim 1 wherein the means for rocking comprises a first hydraulic cylinder operably connected to one fork member, and a second hydraulic cylinder operably connected to the other fork member, a source of hydraulic fluid, means connecting the cylinders to the source for operation in parallel, and control means for selectively operating the cylinders in parallel.

3. In a cotton harvester including a mobile frame adapted for forward motion over a field wherein rows of cotton are planted, harvesting units for removing the cotton from the rows of plants, a cotton harvester basket for receiving the harvested cotton from the conveying means, said basket including fore-and-aft extending sidewalls, a floor connecting the lower portion of the sidewalls, and front and rear end walls connected between the sidewalls and the floor, conveying means for directing a stream of cotton into one end of the receptacle towards the opposite end, and means located adjacent one side of the basket for rocking the basket upwardly about a generally fore-and-aft extending axis to dump the cotton from the basket, an assembly for selectively compacting and holding cotton within the basket, said assembly comprising: first and second generally elongated fork assemblies supported for rocking about a second fore-and-aft extending axis between the front and rear walls below the stream of cotton, said assemblies extending substantially the entire length of the basket and rockable therein independently of each other, means for pivoting the fork assemblies about the axis to compress cotton against the sidewalls as it is directed into the basket, said means generally rocking the two assemblies in unison but permitting the individual assemblies to rock with varying angular relationship to compact the cotton with substantially uniform pressure regardless of differential loading from front to rear in the basket, and means for holding the fork assemblies in a given rocked position to prevent a longitudinal portion of the load from exiting the basket as the basket is rocked about the first axis to dump the cotton.

4. In a cotton harvester having a mobile frame adapted for forward movement in a field of cotton plants, harvesting means for removing cotton from the plants, a fore-and-aft extending basket including transverse sidewalls for receiving harvested cotton, conveyor means for directing the harvested cotton into the receptacle in a preselected direction, and means for rocking the basket upwardly about a fore-and-aft extending axis located adjacent one side of the frame to dump the harvested cotton from the basket, means for selectively retaining a substantial portion of the cotton in the basket during dumping comprising:

a fore-and-aft extending pivot bar supported adjacent a central portion of the basket;

pivoting fork structure extending in the fore-and-aft direction through the basket and connected for transverse rocking within the basket, wherein the fork structure comprises a tubular member rotatably mounted on the pivot bar, and a plurality of fore-and-aft spaced upright beams extending vertically from the tubular member, said beams having a rectangular cross section with the narrow sides of the beams facing outwardly in the direction of rocking;

fork control means for selectively rocking the fork structure towards one of the sidewalls to compress the cotton between the fork structure and said sidewall and maintain a substantial longitudinal portion of the cotton within the basket as the latter is rocked upwardly about the axis; and wherein said fork control means includes means for selectively rocking the fork structure towards the opposite wall during dumping to selectively release said longitudinal portion of the cotton from the basket.

5. The invention as set forth in claim 4 wherein the pivoting fork structure comprises two individually rockable forks, and the fork control means includes individual motor means connected to each fork for providing a substantially equal compressive force against the longitudinal portion regardless of variations in cotton density from front-to-rear in the basket.

6. The invention as set forth in claim 5 wherein each motor means comprises a hydraulic cylinder operably connected to the respective fork, said cylinders connected in parallel to a source of hydraulic fluid.

7. The invention of as set forth in claim 4 wherein the fork structure comprises two of said tubular members supported end-to-end on the pivot bar and independently rockable thereon.

8. The invention as set forth in claim 7 wherein the fork control means includes first and second hydraulic cylinders connected for parallel operation, and means connecting the cylinders to the respective tubular members so that the respective upright beams of said members provide a substantially constant compressive force against the cotton from the front to rear of the basket regardless of differences in front to rear density of the cotton.

9. The invention as set forth in claim 4 wherein the cotton is directed into the basket in a stream extending generally in the fore-and-aft direction and the fork structure is located below the stream and is rockable from a central position in either transverse direction about a fore-and-aft extending axis located adjacent the bottom of the basket.

10. The invention as set forth in claim 4 wherein the basket includes a horizontal surface directly below the pivoting fork structure and the fork structure includes pivot means connecting the fork structure for rocking about a fore-and-aft extending axis located closely adjacent said surface, said means for retaining further comprising an arm operably connected to the fork structure and extending downwardly through an aperture in the horizontal structure, and a hydraulic cylinder located below the horizontal surface connected to the arm so that substantial contact between the cylinder and cotton in the receptacle is prevented.

11. In a cotton harvester including a basket, means for directing cotton in a preselected direction into the basket, means for rocking the basket about a first axis to dump the cotton, a fork member supported for rocking in the basket about a pivotal axis generally parallel to the first axis, means for rocking the fork assembly about the pivotal axis to hold a partial load of cotton against one side of the basket as the basket is rocked about the first axis, and wherein the fork member comprises a pivot member having a circular cross section and fixed to the basket adjacent the bottom portion of the basket, a square tubular member having an inner dimension approximately equal to the diameter of the pivot member and supported on the member for rocking with respect thereto, an a plurality of upright members fixed to the upper side of the square tubular member.

12. The invention as set forth in claim 11 wherein the basket includes a horizontal surface offset slightly below the square tube, and wherein the means for rocking the fork assembly includes an arm fixed to the square tube member and extending downwardly through the aperture in the ledge, and a hydraulic cylinder having one end fixed to the basket and the opposite end pivotally connected to the arm, said cylinder located substantially below the horizontal surface.

13. The invention as set forth in claim 11 comprising two fork members supported end-to-end in the basket for independent rocking about the pivotal axis.

14. The invention as set forth in claim 13 wherein the means for rocking comprises a first hydraulic cylinder operably connected to one fork member, and a second hydraulic cylinder operably connected to the other fork member, a source of hydraulic fluid, means connecting the cylinders to the source for operation in parallel, an control means for selectively operating the cylinders in parallel to provide a substantially constant force of the forks against the cotton regardless of differential basket loading in the axial direction.

15. The invention as set forth in claim 11 wherein the axes extend substantially in said preselected direction.

* * * * *